(12) United States Patent
Jun et al.

(10) Patent No.: US 9,627,685 B2
(45) Date of Patent: *Apr. 18, 2017

(54) METHOD FOR PREPARING LITHIUM IRON PHOSPHATE NANOPOWDER

(71) Applicant: LG Chem, Ltd., Seoul (KR)

(72) Inventors: In Kook Jun, Daejeon (KR); Seung Beom Cho, Daejeon (KR); Myoung Hwan Oh, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/429,062

(22) PCT Filed: Jan. 9, 2014

(86) PCT No.: PCT/KR2014/000262
§ 371 (c)(1),
(2) Date: Mar. 18, 2015

(87) PCT Pub. No.: WO2014/109572
PCT Pub. Date: Jul. 17, 2014

(65) Prior Publication Data
US 2015/0333329 A1  Nov. 19, 2015

(30) Foreign Application Priority Data

Jan. 10, 2013 (KR) .................. 10-2013-0003032
Jan. 8, 2014 (KR) .................. 10-2014-0002568

(51) Int. Cl.
*H01M 4/13* (2010.01)
*H01M 4/58* (2010.01)
(Continued)

(52) U.S. Cl.
CPC ............ *H01M 4/5825* (2013.01); *B82Y 30/00* (2013.01); *C01B 25/45* (2013.01); *C01G 49/009* (2013.01);
(Continued)

(58) Field of Classification Search
CPC ...... H01M 4/583; H01M 4/926; H01M 4/667; H01M 4/8825; H01M 2010/0495
See application file for complete search history.

(56) References Cited

U.S. PATENT DOCUMENTS 5,747,193 A  5/1998 Gerand et al.
7,390,472 B1  6/2008 Singhal et al.
(Continued)

FOREIGN PATENT DOCUMENTS

CN  1803591 A  7/2006
CN  101007630 A  8/2007
(Continued)

OTHER PUBLICATIONS

Jozwiak et al., "The thermal stability, local structure and electrical properties of lithium-iron phosphate glasses", Material Science-Poland, vol. 27, No. 1, 2009, pp. 307-318.*
(Continued)

*Primary Examiner* — Patrick Ryan
*Assistant Examiner* — Julian Anthony
(74) *Attorney, Agent, or Firm* — Lerner, David, Littenberg, Krumholz & Mentlik, LLP

(57) ABSTRACT

The present invention relates to a method for preparing a lithium iron phosphate nanopowder, including the steps of (a) preparing a mixture solution by adding a lithium precursor, an iron precursor and a phosphorus precursor in a reaction solvent, and (b) putting the mixture solution into a reactor and heating to prepare the lithium iron phosphate nanopowder under pressure conditions of 10 to 100 bar, and
(Continued)

a lithium iron phosphate nanopowder prepared by the method. When compared to a common hydrothermal synthesis method and a supercritical hydrothermal synthesis method, a reaction may be performed under a relatively lower pressure. When compared to a common glycothermal synthesis method, a lithium iron phosphate nanopowder having effectively controlled particle size and particle size distribution may be easily prepared.

12 Claims, 3 Drawing Sheets

(51) Int. Cl.
| | | |
|---|---|---|
| H01M 4/00 | (2006.01) | |
| H01M 4/82 | (2006.01) | |
| H01M 6/00 | (2006.01) | |
| H01M 4/36 | (2006.01) | |
| C01B 25/45 | (2006.01) | |
| H01M 4/587 | (2010.01) | |
| H01M 10/0525 | (2010.01) | |
| H01M 4/04 | (2006.01) | |
| B82Y 30/00 | (2011.01) | |
| C01G 49/00 | (2006.01) | |
| H01M 10/052 | (2010.01) | |
| H01M 4/62 | (2006.01) | |
| H01M 4/02 | (2006.01) | |

(52) U.S. Cl.
CPC ....... *H01M 4/0402* (2013.01); *H01M 4/0471* (2013.01); *H01M 4/366* (2013.01); *H01M 4/587* (2013.01); *H01M 10/0525* (2013.01); *C01P 2002/30* (2013.01); *C01P 2004/51* (2013.01); *C01P 2004/62* (2013.01); *C01P 2004/64* (2013.01); *C01P 2006/40* (2013.01); *H01M 4/625* (2013.01); *H01M 4/626* (2013.01); *H01M 10/052* (2013.01); *H01M 2004/028* (2013.01); *H01M 2220/30* (2013.01); *Y02P 20/544* (2015.11)

(56) References Cited

U.S. PATENT DOCUMENTS

| | | | |
|---|---|---|---|
| 8,771,877 B2 | 7/2014 | Yasunaga et al. | |
| 9,065,135 B2 | 6/2015 | Choy et al. | |
| 2004/0157126 A1 | 8/2004 | Belharouak et al. | |
| 2006/0035150 A1 | 2/2006 | Audemer et al. | |
| 2006/0263286 A1 | 11/2006 | Wu et al. | |
| 2007/0054187 A1* | 3/2007 | Nuspl | C01B 25/45 429/218.1 |
| 2007/0148082 A1 | 6/2007 | Heidelberg et al. | |
| 2009/0035204 A1 | 2/2009 | Xu et al. | |
| 2009/0117020 A1 | 5/2009 | Manthiram et al. | |
| 2009/0186275 A1 | 7/2009 | Exnar et al. | |
| 2009/0233096 A1 | 9/2009 | Schall et al. | |
| 2010/0013720 A1 | 1/2010 | Sakata et al. | |
| 2010/0074822 A1 | 3/2010 | Chung | |
| 2010/0183924 A1 | 7/2010 | Song et al. | |
| 2010/0248022 A1 | 9/2010 | Shirakata et al. | |
| 2010/0261060 A1 | 10/2010 | Choy et al. | |
| 2010/0279117 A1* | 11/2010 | Gu | C01B 25/37 428/402 |
| 2011/0017947 A1 | 1/2011 | Nuspl et al. | |
| 2011/0037019 A1 | 2/2011 | Nakano et al. | |
| 2011/0037030 A1 | 2/2011 | Holzapfel et al. | |
| 2011/0091772 A1 | 4/2011 | Mishima et al. | |
| 2011/0104553 A1* | 5/2011 | Pol | B82Y 30/00 429/156 |
| 2012/0003540 A1 | 1/2012 | Nakano et al. | |
| 2012/0058039 A1* | 3/2012 | Huang | B82Y 30/00 423/306 |
| 2012/0231334 A1 | 9/2012 | Kinoshita et al. | |
| 2012/0328947 A1 | 12/2012 | Chou et al. | |
| 2013/0029226 A1 | 1/2013 | Noh et al. | |
| 2013/0136989 A1 | 5/2013 | Wang et al. | |
| 2013/0137009 A1* | 5/2013 | Jin | H01M 4/926 429/482 |
| 2013/0157134 A1 | 6/2013 | Kintaka | |
| 2013/0209865 A1 | 8/2013 | Kim et al. | |
| 2014/0234195 A1 | 8/2014 | Kisailus et al. | |
| 2014/0239235 A1 | 8/2014 | Kong et al. | |
| 2015/0024265 A1 | 1/2015 | Jun et al. | |
| 2015/0024266 A1 | 1/2015 | Jun et al. | |
| 2015/0024271 A1 | 1/2015 | Jun et al. | |
| 2015/0030918 A1 | 1/2015 | Jun et al. | |
| 2015/0037665 A1 | 2/2015 | Jun et al. | |
| 2015/0037666 A1 | 2/2015 | Jun et al. | |
| 2015/0118561 A1 | 4/2015 | Gauthier et al. | |
| 2015/0236349 A1 | 8/2015 | Chiang et al. | |
| 2015/0280236 A1 | 10/2015 | Jun et al. | |
| 2015/0333329 A1 | 11/2015 | Jun et al. | |
| 2015/0357633 A1 | 12/2015 | Jun et al. | |

FOREIGN PATENT DOCUMENTS

| | | |
|---|---|---|
| CN | 101415640 A | 4/2009 |
| CN | 101591012 A | 12/2009 |
| CN | 101630773 A | 1/2010 |
| CN | 101635352 A | 1/2010 |
| CN | 101719548 A | 6/2010 |
| CN | 101777648 A | 7/2010 |
| CN | 101847742 A | 9/2010 |
| CN | 101944601 A | 1/2011 |
| CN | 102299322 A | 12/2011 |
| CN | 102356488 A | 2/2012 |
| CN | 102367170 A | 3/2012 |
| CN | 102420324 A | 4/2012 |
| CN | 102544488 A | 7/2012 |
| CN | 102790216 A | 11/2012 |
| EP | 2413402 A1 | 2/2012 |
| EP | 2413462 A1 | 2/2012 |
| EP | 2562859 A2 | 2/2013 |
| JP | 2002293517 A | 10/2002 |
| JP | 2005116393 A | 4/2005 |
| JP | 2006524623 | 11/2006 |
| JP | 2007-511458 A | 5/2007 |
| JP | 2008103094 A | 5/2008 |
| JP | 2008-130526 A | 6/2008 |
| JP | 4223463 B2 | 2/2009 |
| JP | 2009-532323 A | 9/2009 |
| JP | 2010251302 A | 11/2010 |
| JP | 2011181452 A | 9/2011 |
| JP | 2012-123909 A | 6/2012 |
| JP | 2012155916 A | 8/2012 |
| JP | 2012167314 | 9/2012 |
| JP | 2012195156 A | 10/2012 |
| JP | 2015-527290 A | 9/2015 |
| JP | 2015-527291 A | 9/2015 |
| JP | 2015-530965 A | 10/2015 |
| JP | 2015531738 A | 11/2015 |
| JP | 2015532632 A | 11/2015 |
| KR | 10-2007-0108664 A | 11/2007 |
| KR | 10-0808446 B1 | 3/2008 |
| KR | 10-0939647 B1 | 2/2010 |
| KR | 10-0940979 B1 | 2/2010 |
| KR | 10-1003136 B1 | 12/2010 |
| KR | 2011-0007112 A | 1/2011 |
| KR | 2011-0063390 A | 6/2011 |
| KR | 2011-0071653 A | 6/2011 |
| KR | 2011-0117629 A | 10/2011 |
| KR | 10-2011-0132566 A | 12/2011 |
| KR | 2012-0034060 A | 4/2012 |
| KR | 2012-0038843 A | 4/2012 |
| KR | 2012-0123585 A | 11/2012 |
| TW | 201301644 A | 1/2013 |
| WO | 2007-113624 A1 | 10/2007 |

(56) References Cited

FOREIGN PATENT DOCUMENTS

| WO | 2009131095 A1 | 10/2009 |
|---|---|---|
| WO | 2011132961 A2 | 10/2011 |
| WO | 2012-023439 A1 | 2/2012 |

OTHER PUBLICATIONS

International Search Report for Application No. PCT/KR2014/000262 dated Apr. 22, 2014.
International Search Report for Application No. PCT/KR2014/000264 dated Apr. 23, 2014.
International Search Report for Application No. PCT/KR2014/000265 dated Apr. 22, 2014.
International Search Report from PCT/KR2014/000267 dated Apr. 28, 2014.
International Search Report from PCT/KR2014/000268 dated Apr. 17, 2014.
International Search Report from PCT/KR2014/000269 dated Apr. 28, 2014.
International Search Report from PCT/KR2014/000271 dated Apr. 24, 2014.
International Search Report from PCT/KR2014/000274 dated Apr. 24, 2014.
International Search Report from PCT/KR2014/000275 dated Apr. 24, 2014.
Extended Search Report from European Application No. 14738215.4, dated Nov. 11, 2015.
Extended Search Report from European Application No. 14738106.5, dated Nov. 9, 2015.
Extended Search Report from European Application No. 14738008.3, dated Nov. 9, 2015.
Extended Search Report from European Application No. 14737816.0, dated Sep. 16, 2015.
Extended Search Report from European Application No. 14737874.9, dated Sep. 15, 2015.
Extended Search Report from European Application No. 14738037.2, dated Sep. 21, 2015.
Extended Search Report from European Application No. 14737518.2, dated Sep. 16, 2015.
Extended Search Report from European Application No. 14738003.4, dated Sep. 21, 2015.
Office Action from Chinese Application No. 201480002200.9, dated Nov. 12, 2015.
Office Action from Chinese Application No. 201480002313.9, dated Nov. 20, 2015.
Kim, Dong-Han, et al., Synthesis of LiFePO4 Nanoparticles in Polyol Medium and Their Electrochemical Properties, Electrochemical Solid-State Letters, 2006, vol. 9, No. 9, pp. 439-442.

* cited by examiner

METHOD FOR PREPARING LITHIUM IRON PHOSPHATE NANOPOWDER

CROSS REFERENCE TO RELATED APPLICATIONS

The present application is a national phase entry under 35 U.S.C. § 371 of International Application No. PCT/KR2014/000262, filed Jan. 9, 2014, which claims priority from Korean Patent Application No. 10-2013-0003032, filed Jan. 10, 2013, and Korean Patent Application No. 10-2014-0002568, filed Jan. 8, 2014, the disclosures of which are incorporated herein by reference.

BACKGROUND OF THE INVENTION

Field of the Invention

The present invention relates to a method for preparing a lithium iron phosphate nanopowder.

Description of the Related Art

As technical development and consumption of mobile devices increase, the demand for secondary batteries as energy sources is suddenly increasing. Among such secondary batteries, lithium secondary batteries having high energy density and voltage, a long life cycle, and a low self-discharge rate are being commercialized and widely used.

Common lithium secondary batteries use lithium cobalt oxide ($LiCoO_2$) as the main component of a cathode active material. However, since the cobalt oxide containing lithium is unstable and expensive, the mass production of lithium secondary batteries including thereof is difficult.

Recently, lithium iron phosphate ($LiFePO_4$) compound having a voltage against lithium of ~3.5 V a high volume density of 3.6 g/cm$^3$, and a theoretical capacity of 170 mAh/g, as well as good stability at high temperature, and being cheap when compared to lithium cobalt oxide, is being viewed as a suitable cathode active material for a lithium secondary battery.

As methods for preparing the lithium iron phosphate compound, a solid-state reaction method or a liquid-state reaction method such as a hydrothermal synthesis method and a supercritical hydrothermal synthesis is known. Recently, a glycothermal synthesis method is using a non-aqueous solution such as ethylene glycol or diethylene glycol as a reaction solvent has been developed. According to the hydrothermal synthesis method and the supercritical hydrothermal synthesis method, the preparation of the lithium iron phosphate nanopowder is performed under high temperature and high pressure conditions, giving rise to safety concerns. In addition, according to the glycothermal synthesis method, the control of the particle size and the particle size distribution of the lithium iron phosphate nanopowder may be difficult.

SUMMARY OF THE INVENTION

An aspect of the present invention provides a method for preparing a lithium iron phosphate nanopowder by a glycothermal synthesis method and using a novel reaction solvent to resolve the above-described limitations, by which a reaction may be performed under relatively low pressure conditions when compared to a common hydrothermal synthesis method and a supercritical hydrothermal synthesis method, and a particle size and a particle size distribution may be effectively controlled when compared to a common glycothermal synthesis method.

According to an aspect of the present invention, there is provided a method for preparing a lithium iron phosphate nanopowder including (a) preparing a mixture solution by adding a lithium precursor, an iron precursor and a phosphorus precursor in a reaction solvent, and (b) putting the reaction mixture into a reactor and heating to form a lithium iron phosphate nanopowder under pressure conditions of 10 to 100 bar.

According to another aspect of the present invention, there is provided a lithium iron phosphate nanopowder prepared by the method, and a cathode active material including the same.

According to still another aspect of the present invention, there is provided a cathode including the cathode active material and a lithium secondary battery including the cathode.

According to the method for preparing a lithium iron phosphate nanopowder, a reaction may be performed under relatively lower pressure conditions when compared to a common hydrothermal synthesis method and a supercritical hydrothermal synthesis method, such that process safety and economic feasibility may be secured. In addition, a lithium iron phosphate nanopowder of which particle size and particle size distribution are effectively controlled when compared to a common glycothermal synthesis method may be easily prepared.

A lithium secondary battery including the lithium iron phosphate nanopowder thus prepared as a cathode active material has good capacity and stability.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
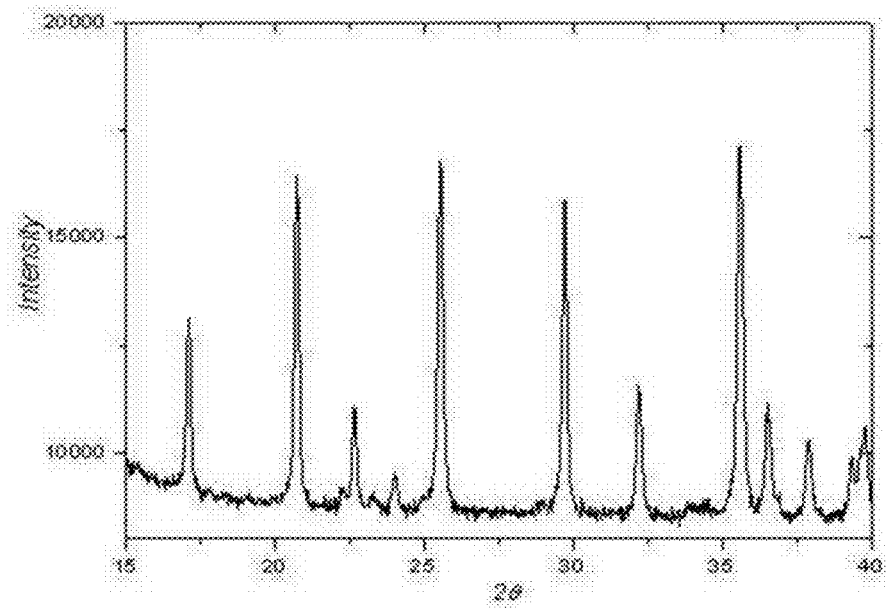
FIG. 1 is an X-ray diffraction (XRD) pattern of a lithium iron phosphate nanopowder prepared according to an embodiment of the present invention (Example 1)

Exemplary embodiments of the present invention will now be described in detail.

In the present invention, a method for preparing a lithium iron phosphate nanopowder by means of a glycothermal method which is one liquid-state reaction method is provided. Particularly, a reaction may be performed under relatively low pressure conditions when compared to a common hydrothermal synthesis method and a supercritical hydrothermal synthesis method by using a novel reaction solvent, and a lithium iron phosphate nanopowder having an effectively controlled particle size and particle size distribution when compared to a common glycothermal synthesis method may be prepared.

In an embodiment for attaining an aspect of the invention, a method for preparing a lithium iron phosphate nanopowder including (a) preparing a mixture solution by adding a lithium precursor, an iron precursor and a phosphorus precursor in a reaction solvent, and (b) putting the reaction mixture into a reactor and heating to form a lithium iron phosphate nanopowder under the pressure conditions of 10 to 100 bar, is provided.

In another embodiment of the present invention, the method may further include (c) heat treating the lithium iron phosphate nanopowder thus prepared to form a coating layer on a portion or the whole of the surface of the individual particle of the nanopowder.

First, a lithium precursor, an iron precursor, and a phosphorus precursor are prepared and added in a reaction solvent to prepare a homogeneous mixture solution (Step (a)).

The lithium precursor thus added may be at least one selected from the group consisting of lithium acetate dihydrate ($CH_3COOLi.2H_2O$), lithium hydroxide monohydrate ($LiOH.H_2O$), lithium hydroxide (LiOH), lithium carbonate ($Li_2CO_3$), lithium phosphate ($Li_3PO_4$), lithium phosphate dodecahydrate ($Li_3PO_4.12H_2O$) and lithium oxalate ($Li_2C_2O_4$), or a mixture of two or more thereof.

The iron precursor added may be at least one selected from the group consisting of iron citrate ($FeC_6H_5O_7$), iron citrate hydrate ($FeC_6H_5O_7.nH_2O$), ferrous sulfate heptahydrate ($FeSO_4.7H_2O$), iron(II) oxalate dihydrate ($FeC_2O_4.2H_2O$), iron acetyl acetonate ($Fe(C_5H_7O_2)_3$), iron phosphate dihydrate ($FePO_4.2H_2O$) and ferric hydroxide (FeO(OH)), or a mixture of two or more thereof.

The phosphorus precursor added may be at least one selected from the group consisting of tri-ammonium phosphate trihydrate ($(NH_4)_3PO_4.3H_2O$), ammonium phosphate ($(NH_4)_2HPO_4$), ammonium dihydrogen phosphate ($NH_4H_2PO_4$) and phosphoric acid ($H_3PO_4$), or a mixture of two of more thereof.

Meanwhile, the mixing ratio of the lithium precursor, the iron precursor and the phosphorus precursor during the forming of the mixture solution is not specifically limited, and may be, for example, 0.1-10:1:0.1-10 by the molar ratio.

In addition, the iron precursor may be added from about 0.005 to about 1 parts by weight based on 1 part by weight of the reaction solvent, and the lithium precursor and the phosphorus precursor may be added by corresponding molar ratios considering the amount of the iron precursor.

A stirring step may be further conducted during preparing the mixture solution so that the lithium precursor, the iron precursor and the phosphorus precursor may be homogeneously dispersed in the reaction solvent.

Meanwhile, the reaction solvent may be a butandiol solvent which is a non-aqueous solvent and has a relatively high boiling point.

In an embodiment of the present invention, the reaction solvent may include at least one selected from the group consisting of 1,2-butandiol, 1,3-butandiol, 1,4-butandiol, 2,3-butandiol and an isomer thereof.

The boiling point of the 1,2-butandiol is about 195° C., the boiling point of the 1,3-butandiol is about 204° C., the boiling point of the 1,4-butandiol is about 235° C., and the boiling point of the 2,3-butandiol is about 177° C.

The lithium iron phosphate nanopowder was verified to be synthesized at temperature conditions of at least about 150° C.

That is, when the above-described reaction solvents are used for preparing the lithium iron phosphate nanopowder, the reaction may be performed at a temperature less than the boiling point of the reaction solvent, and the vaporization degree of the reaction solvent may decrease. Thus, the pressure increase due to vaporization of solvents during the performing of the reaction may be significantly suppressed when compared to a common hydrothermal synthesis method. Therefore, safety throughout the process may be improved.

In addition, since the above described solvents are non-aqueous, the problem of iron oxidation may be resolved without using a separate reducing agent.

Then, the mixture solution was put into the reactor and heated to prepare the lithium iron phosphate powder under the pressure conditions of 10 to 100 bar (Step (b)).

The reactor is a pressure-resistant vessel that may endure the pressure conditions from 10 to 100 bar, and may be a generally used reactor in a glycothermal synthesis method. The material of the reactor may be a low carbon steel, an alloy steel of chromium, nickel or molybdenum, etc. In an embodiment of the present invention, the reactor may be an autoclave.

Meanwhile, the above Step (b) may be performed at the temperature range of at least 150° C. which is the minimum temperature for synthesizing the lithium iron phosphate nanopowder, and at a temperature range less than or equal to the boiling point of the reaction solvent used.

For example, when the reaction solvent used in the present invention is 1,2-butandiol, the above Step (b) may be performed at 150 to 195° C., and when the reaction solvent is 1,3-butandiol, the above Step (b) may be performed at 150 to 204° C. In addition, when the reaction solvent used in the present invention is 1,4-butandiol, the above Step (b) may be performed at 150 to 235° C., and when the reaction solvent is 2,3-butandiol, the above Step (b) may be performed at 150 to 177° C.

That is, the reaction is performed at a temperature between the minimum temperature for synthesizing the lithium iron phosphate nanopowder and a temperature less than or equal to the boiling point of the reaction solvent, and the vaporization of the reaction solvent is slowed down. Thus, the pressure increase of the reactor due to the vaporization of the solvent may be suppressed when compared to a common hydrothermal synthesis method, etc.

Meanwhile, the pressure in the reactor during the performing of the above Step (b) is in the range of 10 to 100 bar. The pressure is relatively low when compared to that of a common hydrothermal synthesis method (at least about 100 bar) or of a supercritical hydrothermal synthesis method (at least about 220 bar), which provides an even better effect when considering process safety and economic feasibility.

The processing time of the above Step (b) may be changed according to the reaction solvent used and the reaction temperature.

In an embodiment of the present invention, when 1,4-butandiol is used as the reaction solvent, the above Step (b) may be conducted at a temperature range of 150 to 235° C. for 1 to 48 hours, and more particularly, may be conducted at a temperature range of 180 to 235° C. for 1 to 24 hours.

When Step (b) is finished, lithium iron phosphate nanopowder particles may be synthesized, and a washing step and a drying step for recovering lithium iron phosphate nanopowder particles in Step (b) may be conducted consecutively.

The washing method in the washing step is not specifically limited, and may be conducted consecutively by using acetone and methanol.

The drying method in the drying step is not specifically limited, and may be conducted at a temperature range of 20 to 160° C. for 2 to 40 hours.

The lithium iron phosphate nanopowder synthesized through the processes may be heat treated to form a coating layer on a portion or the whole of the surfaces of individual particles of the powder (Step (c)).

The above Step (c) may be performed through heat treating. The heat treating is not specifically limited and may be conducted by heating to a temperature range of 400 to 900° C., for example. Through the heat treating, a carbon coating layer or a coating layer composed of a glassy lithium compound may be formed on a portion or the whole of the surfaces of the particles.

When the coating layer is the carbon coating layer, the precursor of the coating layer may be the reaction solvent remaining on the surfaces of the particles after use. Particularly, the reaction solvent used may remain on the surfaces of the particles after conducting the drying step and may be carbonized during the heat treatment at a temperature range of 400 to 900° C., thereby forming the carbon coating layer on the surfaces of the particles.

A separate organic compound may be used as the precursor of the carbon coating layer, and the addition step of the separate organic compound for forming the carbon coating layer on the surfaces of the lithium iron phosphate nanopowder particles is not specifically limited.

In an embodiment of the present invention, the organic compound may be mixed with the solvent together with the lithium precursor, the iron precursor and the phosphorus precursor and react to form the carbon coating layer on the surfaces of the particles during the forming of the lithium iron phosphate particles.

In another embodiment, the lithium precursor, the iron precursor and the phosphorus precursor are mixed with the solvent and react to form the lithium iron phosphate particles, and then, the organic compound is added, mixed and heat treated to form the carbon coating layer on the surfaces of the particles.

In further another embodiment, the lithium precursor, the iron precursor and the phosphorus precursor are mixed with the solvent and react to form the lithium iron phosphate particles, and washing and drying processes are performed. Thereafter, the organic compound is added, mixed and heat treated to form the carbon coating layer on the surfaces of the particles.

The organic compound is not specifically limited, and may be at least one selected from the group consisting of glucose, sucrose, galactose, fructose, lactose, starch, mannose, ribose, aldohexose, ketohexose, and a combination thereof, or a mixture of two or more thereof.

When the coating layer is the glassy lithium compound coating layer, the coating layer is not specifically limited, and may be, for example, a lithium phosphate-based amorphous coating layer. In this case, the precursor material may be a lithium precursor and a phosphorus precursor, and may be an additional lithium compound and phosphorus compound.

The thickness of the carbon coating layer or the glassy lithium compound coating layer formed on the surfaces of the particles in this step is not specifically limited, and may be, for example, less than or equal to 10 nm.

Since the lithium iron phosphate powder has low electric conductivity, the electric conductivity of the lithium iron phosphate powder may be improved by forming the carbon coating layer or the coating layer including the glassy lithium compound on a portion of or the whole surfaces of the minute lithium iron phosphate powder particles thus prepared.

The lithium iron phosphate nanopowder particles prepared through the series of the above-described steps may have an olivine structure.

The particle size and the particle size distribution of the particles may be controlled by changing the lithium precursor, the iron precursor, or the phosphorus precursor, or regulating processing variables such as reaction temperature and reaction time, etc. For example, the size of the lithium iron phosphate particles may be decreased when using lithium acetate as the lithium precursor. In addition, the size of the lithium iron phosphate may increase when the reaction temperature is elevated or the reaction time is prolonged.

The particle size (Hereinafter will be referred to as particle diameter) of the lithium iron phosphate nanopowder prepared through the above-described process is not specifically limited, and may be, for example, 30 to 300 nm. The particle size distribution is not specifically limited and may be, for example, less than or equal to 50% of the average value of the particle diameter.

Preparation of Lithium Secondary Battery

In the present invention, a cathode active material including the lithium iron phosphate nanopowder having the olivine crystal structure may be provided. The cathode active material may selectively further include a conductive agent, a binder and a filler other than the lithium iron phosphate powder.

The conductive agent may include any material having conductivity and not inducing a chemical change in a battery without specific limitation, and may include graphite such as natural graphite and synthetic graphite; carbon blacks such as carbon black, acetylene black, ketchen black, channel black, furnace black, lamp black, and thermal black; conductive fibers such as a carbon fiber and a metal fiber; metal powders such as a carbon fluoride powder, an aluminum powder and a nickel powder; conductive whiskers such as zinc oxide and potassium titanate; conductive metal oxides such as titanium oxide; and conductive materials such as a polyphenylene derivative. Generally, the conductive agent may be included by 1 to 30 wt % based on the total amount of a mixture including the cathode active material.

The binder may be any component that assists the bonding of the active material and the conductive agent and the bonding with a current collector without specific limitation, and may include, for example, polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer (EPDM), sulfonated EPDM, a styrene butadiene rubber, a fluorine rubber, various copolymers, etc.

Generally, the binder may be included by 1 to 30 wt % based on the total amount of a mixture including the cathode active material.

The filler is a component suppressing the expansion of an electrode and may be selectively used. The filler may be any fibrous material that may not induce a chemical change in the battery, without specific limitation, and may include, for example, an olefin-based polymer such as polyethylene and polypropylene; and a fibrous material such as a glass fiber and a carbon fiber.

In addition, in an embodiment of the present invention, a cathode for a lithium secondary battery obtained by coating the cathode active material on a current collector is provided.

The cathode for the lithium secondary battery may be fabricated by, for example, dissolving the cathode active material in a solvent to prepare a slurry, coating the slurry on the current collector, drying and pressing.

The current collector of the cathode may be any material having conductivity and not inducing chemical change of the battery, without specific limitation, and may include, for example, stainless steel, aluminum, nickel, titanium, fired carbon, or a surface treated material of the aluminum or the stainless steel with carbon, nickel, titanium, silver, etc.

Generally, the current collector may have a thickness of 3 to 500 µm, and minute embossing may be formed on the surface of the current collector to increase the adhesiveness of the cathode active material. Various shapes such as a film, a sheet, a foil, a net, a porous material, a foamed material, a non-woven fabric, etc. may be used as the current collector.

In addition, in an embodiment of the present invention, a lithium secondary battery including a cathode including the cathode active material, an anode, a separator and a non-aqueous electrolyte containing a lithium salt may be provided.

The anode may be fabricated by, for example, coating an anode mixture including an anode active material on an anode current collector, and drying. In the anode mixture, the above-described components such as the conductive agent, the binder and the filler may be included as occasion demands.

The anode current collector may be any material having high conductivity and not inducing the chemical change of the battery, without specific limitation, and may include, for example, copper, stainless steel, aluminum, nickel, fired carbon, a surface treated material of copper or stainless steel with carbon, nickel, titanium, silver, etc., and an alloy of aluminum-cadmium.

Meanwhile, the current collector may have the thickness of 3 to 500 µm, and minute embossing may be formed on the surface of the current collector to increase the adhesiveness of the anode active material as in the cathode current collector. Various shapes such as a film, a sheet, a foil, a net, a porous material, a foamed material, a non-woven fabric, etc. may be used as the current collector.

The separator is disposed between the cathode and the anode, and an insulating thin film having high ion transmittance and high mechanical strength may be used.

The pore diameter of the separator may be generally from 0.01 to 10 µm, and the thickness thereof may be generally from 5 to 300 µm.

The separator may include a chemical resistant and hydrophobic olefin-based polymer such as polypropylene; a sheet or a non-woven fabric formed by using a glass fiber or polyethylene, etc.

When a solid electrolyte such as a polymer is used as the electrolyte, the solid electrolyte may also play the role of the separator.

The non-aqueous electrolyte containing the lithium salt includes the electrolyte and the lithium salt, and the electrolyte may include a non-aqueous organic solvent or an organic solid electrolyte.

The non-aqueous organic solvent may include, for example, aprotic organic solvents such as N-methyl-2-pyrrolidone, propylene carbonate, ethylene carbonate, butylene carbonate, dimethyl carbonate, diethyl carbonate, gamma-butyrolactone, 1,2-dimethoxyethane, tetrahydroxyfuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The organic solid electrolyte may include, for example, polyethylene derivatives, polyethylene oxide derivatives, polypropylene oxide derivatives, a phosphoric acid ester polymer, poly agitation lysine, polyester sulfide, polyvinyl alcohol, polyvinylidene fluoride, and a polymer containing an ionic dissociable group.

The lithium salt may include a material favorably soluble in the non-aqueous electrolyte such as LiCl, LiBr, LiI, LiClO$_4$, LiBF$_4$, LiB$_{10}$C$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, a low molecular weight aliphatic lithium carbonate, lithium 4-phenylborate, imide, etc.

In addition, the electrolyte may further include (for improving charge and discharge properties, and flame retardance, etc.), for example, pyridine, triethyl phosphite, triethanolamine, a cyclic ether, ethylenediamine, n-glyme, hexaphosphoric acid amide, nitrobenzene derivatives, sulfur, a quinone imine dye, N-substituted oxazolidinone, N,N-substituted imidazolidine, an ethylene glycol dialkyl ether, an ammonium salt, pyrrole, 2-methoxyethanol, trichloro aluminum, etc. A halogen-containing solvent such as carbon tetrachloride, trifluoroethylene, etc. may be further included to impart incombustibility, and a carbon dioxide gas may be further included to improve preservation properties at a high temperature.

As described above, the method for preparing the lithium iron phosphate nanopowder of the present invention may be performed at relatively lower pressure conditions when compared to a common hydrothermal synthesis method or a supercritical hydrothermal synthesis method by using a glycothermal synthesis method that is a liquid-state reaction method and by using a novel reaction solvent. In addition, the particle size and the particle size distribution of the lithium iron phosphate nanopowder may be effectively controlled when compared to the common glycothermal synthesis method. Further, the safety and economical feasibility of the method may be secured according to the preparation method of the present invention. A lithium secondary battery including the lithium iron phosphate nanopowder thus prepared as a cathode active material may have good capacity and stability.

EXAMPLES

Exemplary embodiments of the invention will be described below in more detail. The present invention may, however, be embodied in different forms and should not be construed as limited to the embodiments set forth herein. Rather, these embodiments are provided so that this disclosure will be thorough and complete, and will fully convey the scope of the inventive concept to those skilled in the art.

Example 1

2.04 g of lithium acetate dihydrate (CH$_3$COOLi.2H$_2$O), 4.90 g of ferric citrate hydrate (FeC$_6$H$_5$O$_7$.nH$_2$O) and 1.96 g of phosphoric acid ($H_3PO_4$) were added in 50 ml of 1,4-butandiol and sufficiently stirred to prepare a mixture solution.

The sufficiently stirred mixture solution was put into a 100 ml autoclave and a reaction was performed at 200° C. for 18 hours.

After finishing the reaction, the remaining reactant was cooled and washed consecutively using acetone and methanol.

After washing, the product was dried using a vacuum drier.

Figure 2:
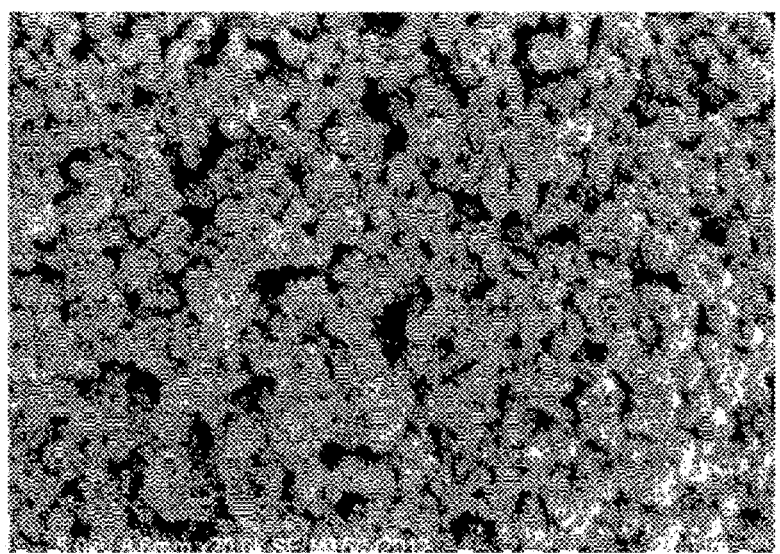
FIG. 2 is a photographic image of a scanning electron microscope (SEM) of a lithium iron phosphate nanopowder prepared according to an embodiment of the present invention (Example 1)

After finishing the washing and drying, the reaction product thus obtained was analyzed by means of an X-ray diffraction spectroscopy and a scanning electron microscope. The reaction product was confirmed to be a lithium iron phosphate nanopowder having a pure olivine crystal structure (See FIGS. 1 and 2).

Figure 3:
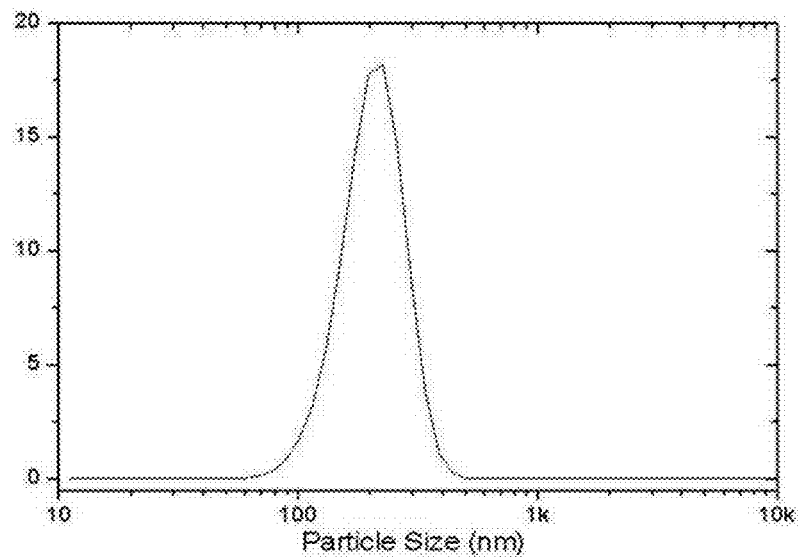
FIG. 3 illustrates particle size distribution of a lithium iron phosphate nanopowder prepared according to an embodiment of the present invention (Example 1)

In addition, the particle size distribution of the lithium iron phosphate nanopowder thus prepared was measured and is illustrated as a graph in FIG. 3. As shown in the graph, uniform particles having the size of about 200 nm were prepared.

Example 2

0.42 g of lithium hydroxide hydrate ($LiOH.H_2O$), 2.45 g of ferric citrate hydrate and 0.98 g of phosphoric acid were added in 50 ml of 1,4-butandiol and sufficiently stirred to prepare a mixture solution.

The sufficiently stirred mixture solution was put into a 100 ml autoclave and a reaction was performed at 180° C. for 18 hours.

After finishing the reaction, the remaining reactant was cooled and washed consecutively using acetone and methanol.

After washing, the product was dried using a vacuum drier.

Figure 4:
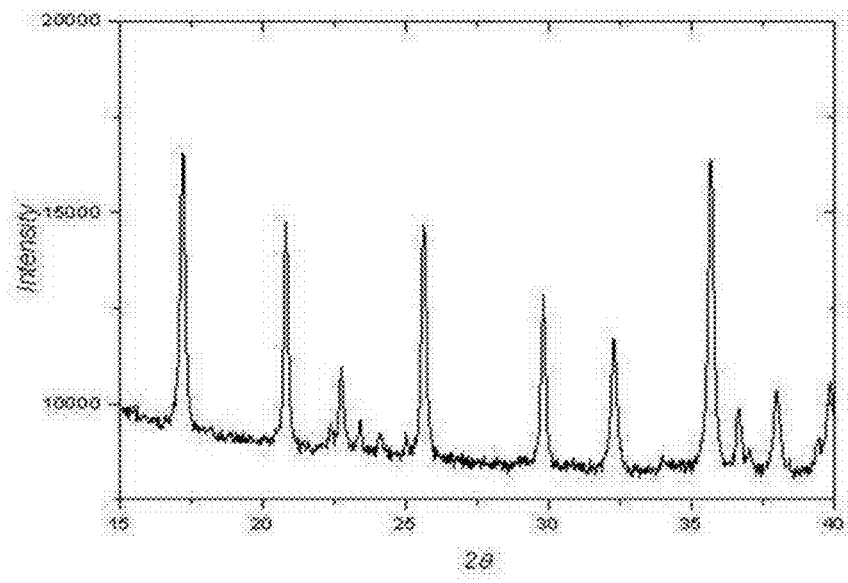
FIG. 4 is an X-ray diffraction (XRD) pattern of a lithium iron phosphate nanopowder prepared according to an embodiment of the present invention (Example 2)
Figure 5:
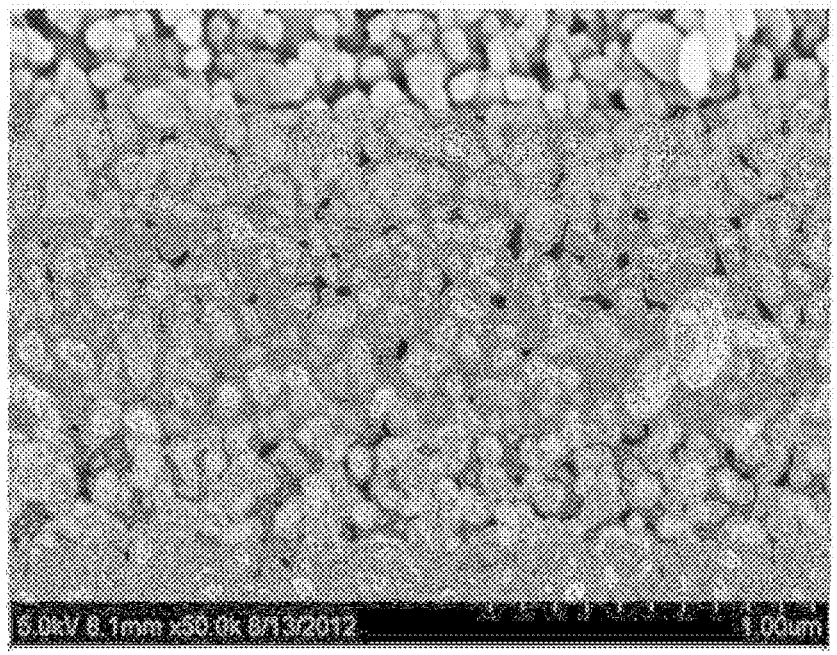
FIG. 5 is a photographic image of a scanning electron microscope (SEM) of a lithium iron phosphate nanopowder prepared according to an embodiment of the present invention (Example 2)

After finishing the washing and drying, the reaction product thus obtained was analyzed by means of an X-ray diffraction spectroscopy and a scanning electron microscope. The reaction product was confirmed to be a lithium iron phosphate nanopowder having a pure olivine crystal structure (See FIGS. 4 and 5).

Figure 6:
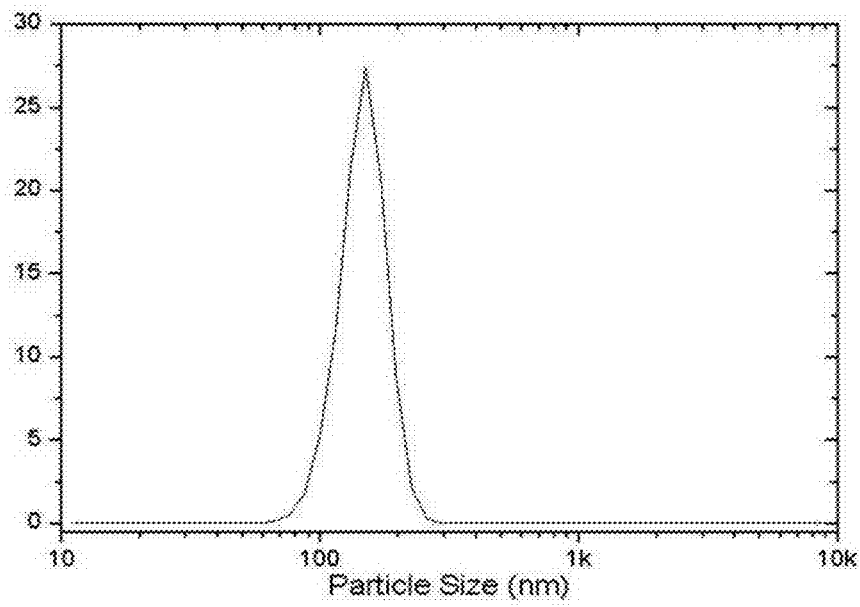
FIG. 6 illustrates particle size distribution of a lithium iron phosphate nanopowder prepared according to an embodiment of the present invention (Example 2).

In addition, the particle size distribution of the lithium iron phosphate nanopowder thus prepared was measured and is illustrated as a graph in FIG. 6. As shown in the graph, uniform particles having the size of about 150 nm were prepared.

As shown through Examples 1 and 2, the lithium iron phosphate nanopowder prepared by the method of the present invention has small and uniform particle size and good particle size distribution properties.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for preparing a lithium iron phosphate nanopowder for a lithium secondary battery, comprising the steps of:
   (a) preparing a mixture solution by adding a lithium precursor, an iron precursor and a phosphorus precursor in a reaction solvent; and
   (b) putting the mixture solution into a reactor and heating to prepare the lithium iron phosphate nanopowder under pressure conditions of 10 to 100 bar,
   wherein the reaction solvent is at least one selected from the group consisting of 1,2-butanediol, 1,3-butanediol, 1,4-butanediol, 2,3-butanediol, and an isomer thereof.

2. The method for preparing a lithium iron phosphate nanopowder for a lithium secondary battery of claim 1, further comprising the step of (c) heat treating the lithium iron phosphate nanopowder thus prepared to form a coating layer at a portion or a whole of a surface of an individual particle of the nanopowder.

3. The method for preparing a lithium iron phosphate nanopowder for a lithium secondary battery of claim 2, wherein the heat treating is performed by heating to a temperature range of 400 to 900° C.

4. The method for preparing a lithium iron phosphate nanopowder for a lithium secondary battery of claim 1, wherein the lithium iron phosphate nanopowder prepared in Step (b) is consecutively washed and dried.

5. The method for preparing a lithium iron phosphate nanopowder for a lithium secondary battery of claim 4, wherein the washing is performed by consecutively using acetone and methanol.

6. The method for preparing a lithium iron phosphate nanopowder for a lithium secondary battery of claim 4, wherein the drying is performed at 20 to 160° C. for 2 to 40 hours.

7. The method for preparing a lithium iron phosphate nanopowder for a lithium secondary battery of claim 1, wherein Step (b) is performed at a temperature less than or equal to a boiling point of the reaction solvent.

8. The method for preparing a lithium iron phosphate nanopowder for a lithium secondary battery of claim 1, wherein Step (b) is performed at a temperature range of 150 to 235° C.

9. The method for preparing a lithium iron phosphate nanopowder for a lithium secondary battery of claim 1, wherein Step (b) is performed for 1 to 48 hours.

10. The method for preparing a lithium iron phosphate nanopowder for a lithium secondary battery of claim 1, wherein the lithium precursor is at least one selected from the group consisting of lithium acetate dihydrate ($CH_3COOLi.2H_2O$), lithium hydroxide monohydrate ($LiOH.H_2O$), lithium hydroxide (LiOH), lithium carbonate ($Li_2CO_3$), lithium phosphate ($Li_3PO_4$), lithium phosphate dodecahydrate ($Li_3PO_4.12H_2O$) and lithium oxalate ($Li_2C_2O_4$), or a mixture of two or more thereof.

11. The method for preparing a lithium iron phosphate nanopowder for a lithium secondary battery of claim 1, wherein the iron precursor is at least one selected from the group consisting of iron citrate ($FeC_6H_5O_7$), iron citrate hydrate ($FeC_6H_5O_7.nH_2O$), ferrous sulfate heptahydrate ($FeSO_4.7H_2O$), iron(II) oxalate dihydrate ($FeC_2O_4.2H_2O$), iron acetyl acetonate ($Fe(C_5H_7O_2)_3$), iron phosphate dihydrate ($FePO_4.2H_2O$) and ferric hydroxide (FeO(OH)), or a mixture of two or more thereof.

12. The method for preparing a lithium iron phosphate nanopowder for a lithium secondary battery of claim 1, wherein the phosphorus precursor is at least one selected from the group consisting of tri-ammonium phosphate trihydrate (($NH_4)_3PO_4.3H_2O$), ammonium phosphate (($NH_4)_2HPO_4$), ammonium dihydrogen phosphate ($NH_4H_2PO_4$) and phosphoric acid ($H_3PO_4$), or a mixture of two of more thereof.

\* \* \* \* \*